(12) United States Patent
Jiang et al.

(10) Patent No.: US 11,798,001 B2
(45) Date of Patent: Oct. 24, 2023

(54) PROGRESSIVELY VALIDATING ACCESS TOKENS

(71) Applicant: International Business Machines Corporation, Armonk, NY (US)

(72) Inventors: Peng Hui Jiang, Beijing (CN); Xin Peng Liu, Beijing (CN); Wei Wu, Beijing (CN); Xiao Ling Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 159 days.

(21) Appl. No.: 17/479,063

(22) Filed: Sep. 20, 2021

(65) Prior Publication Data

US 2023/0092902 A1     Mar. 23, 2023

(51) Int. Cl.
  *G06Q 20/40*   (2012.01)
  *G06Q 20/38*   (2012.01)
  *H04L 9/32*    (2006.01)

(52) U.S. Cl.
  CPC ....... *G06Q 20/407* (2013.01); *G06Q 20/3829* (2013.01); *G06Q 20/405* (2013.01); *G06Q 20/4014* (2013.01); *H04L 9/3234* (2013.01)

(58) Field of Classification Search
  CPC ............. G06Q 20/407; G06Q 20/3829; G06Q 20/4014; G06Q 20/405; G06Q 20/40; G06Q 20/38; H04L 9/3234
  See application file for complete search history.

(56) References Cited

U.S. PATENT DOCUMENTS

| | | | |
|---|---|---|---|
| 8,490,152 | B2 | 7/2013 | Staiman et al. |
| 8,824,664 | B1 | 9/2014 | Ristock et al. |
| 10,055,607 | B2 | 8/2018 | Sathyadevan et al. |
| 11,057,393 | B2 | 7/2021 | Coffing |
| 2015/0032626 | A1 | 1/2015 | Dill et al. |
| 2016/0036991 | A1* | 2/2016 | Brewer ............... H04M 7/1285 370/356 |
| 2016/0314460 | A1 | 10/2016 | Subramanian et al. |
| 2018/0278624 | A1* | 9/2018 | Kuperman ............ G06F 21/602 |

(Continued)

FOREIGN PATENT DOCUMENTS

| | | |
|---|---|---|
| CN | 112788031 A | 5/2021 |
| WO | 2014011376 A1 | 1/2014 |

OTHER PUBLICATIONS

International Search Report; International Application No. PCT CN2022/119007; International Filing Date: Sep. 15, 2022; dated Dec. 13, 2022; 9 pages.

*Primary Examiner* — Quazi Farooqui
(74) *Attorney, Agent, or Firm* — CANTOR COLBURN LLP; Teddi Maranzano

(57) ABSTRACT

Embodiments relate to progressively validating access token. In response to intercepting an initial call for a transaction for a service from a client, a token is validated for the initial call of the transaction for the service, the validating including contacting an authentication sever and locally storing a time to live received for the token. In response to intercepting at least one successive call for the transaction for the service from the client, it is determined that the token for the at least one successive call is valid based on the time to live locally saved. The at least one successive call for the transaction for the service is permitted to pass without contacting the authentication sever.

19 Claims, 17 Drawing Sheets

(56) References Cited

U.S. PATENT DOCUMENTS

2018/0295126 A1      11/2018  Gilpin
2019/0207771 A1 *    7/2019   Hecht ................. H04L 63/1408
2020/0204371 A1      6/2020   Chengalvala et al.

* cited by examiner

PROGRESSIVELY VALIDATING ACCESS TOKENS

BACKGROUND

The present invention generally relates to computer systems, and more specifically, to computer-implemented methods, computer systems, and computer program products configured and arranged for progressively validating access tokens.

Modern secure applications often use access tokens to ensure that a user has access to the appropriate resources, and these access tokens typically have a limited lifetime. This is done for various security reasons; one reason is that limiting the lifetime of the access token limits the amount of time an attacker can use a stolen token. In addition, the information contained in or referenced by the access token could become stale. When access tokens expire or become invalid but the application still needs to access a protected resource, the application faces the problem of getting a new access token without forcing the user to once again grant permission. To solve this problem, OAuth 2.0 (an industry-standard for authorization) introduced an artifact called a refresh token. A refresh token allows an application to obtain a new access token without prompting the user.

Access tokens are used in token-based authentication to allow an application to access an application programming interface (API). The application receives an access token after a user successfully authenticates and authorizes access, and then the application passes the access token as a credential when it calls the target API (e.g., associated with the target resource). The passed token informs the API that the bearer of the token has been authorized to access the API and perform specific actions specified by the scope that was granted during authorization.

Auth0 issues an access token or an identification (ID) token in response to an authentication request. The application can use access tokens to make authenticated calls to a secured API, while the ID token contains user profile attributes represented in the form of claims. Both are JavaScript Object Notation (JSON) web tokens (JWTs) and therefore have expiration dates indicated using the "exp" (expiration time) claim, as well as security measures, like signatures. Typically, a user needs a new access token when gaining access to a resource for the first time, or after the previous access token granted to them expires. As noted above, a refresh token is a special kind of token used to obtain a renewed access token, and the application can request new access tokens until the refresh token is on the DenyList which indicates that it can no longer be used. Applications store refresh tokens securely because they allow a user to remain authenticated.

Although existing techniques for using tokens are suitable for their intended purposes, what is needed is a system having certain features of embodiments of the present invention.

SUMMARY

Embodiments of the present invention are directed to computer-implemented methods for progressively validating access tokens. A non-limiting example computer-implemented method includes, in response to intercepting an initial call for a transaction for a service from a client, validating a token for the initial call of the transaction for the service, the validating including contacting an authentication sever and locally storing a time to live received for the token. The computer-implemented method includes, in response to intercepting at least one successive call for the transaction for the service from the client, determining that the token for the at least one successive call is valid based on the time to live locally saved. The computer-implemented method includes permitting the at least one successive call for the transaction for the service to pass without contacting the authentication sever.

This can provide an improvement over known methods by progressively validating the token for the transaction, which greatly ensures security for the managed system and service. As further improvements, the duration of the token is not limited to a short period, it always captures the invalid token as early as possible, the cost (e.g., time and repeated communications) of validating the token is reduced, and it supports multiple types of tokens.

In addition to one or more of the features described above or below, or as an alternative, in further embodiments of the invention the method includes determining that the at least one successive call is a last call for the transaction and committing the transaction. Thus, this advantageously provides techniques that validate the token without contacting the authentication server.

In addition to one or more of the features described above or below, or as an alternative, in further embodiments of the invention the method includes determining that the token for a last successive call is invalid based on the time to live locally saved having expired, preventing the last successive call for the transaction for the service from passing, and rolling back the transaction. Thus, this advantageously provides techniques that can use the locally stored information to validate the token without contacting the authentication server.

In addition to one or more of the features described above or below, or as an alternative, in further embodiments of the invention the method includes, in response to committing the transaction or rolling back the transaction, clearing the time to live for the token thereby avoiding unauthorized reuse of the token. Thus, this advantageously provides techniques that can use the locally stored information to validate the token without contacting the authentication server, while preventing misuse of the token.

In addition to one or more of the features described above or below, or as an alternative, in further embodiments of the invention determining that the token for the at least one successive call is valid based on the time to live locally saved includes preventing a backend services computer system from contacting the authentication sever for validation of the token for the at least one successive call. Thus, this advantageously provides techniques that can use the locally stored information to quickly validate the token without contacting the authentication server.

In addition to one or more of the features described above or below, or as an alternative, in further embodiments of the invention determining that the token for the at least one successive call is valid based on the time to live locally saved avoids requiring a backend services computer system from contacting the authentication sever for validation of the token for the at least one successive call. Thus, this advantageously provides techniques that can use the locally stored information to quickly validate the token without contacting the authentication server.

A non-limiting example computer-implemented method includes, in response to intercepting a token call with an application programming interface (API) key for a transaction for a service from a client, contacting an access decision engine to obtain a token list for the APIkey and an access policy for the APIkey, where the APIkey, the token list, and the access policy are associated together and locally stored. The computer-implemented method includes in response to intercepting a call for the service having the APIkey and a token, determining that the call is to be given access to the service based on the token list and the access policy for the APIkey locally stored, and permitting the call for the service to access a resource without contacting the access decision engine.

This can provide an improvement over known methods by reducing the token validation access to an access decision engine and reduce the risk of token misuse when the attached APIkey is revoked.

In addition to one or more of the features described above or below, or as an alternative, in further embodiments of the invention the method includes determining that a subsequent call for the service having the APIkey and another token is to be given access to the service based on the token list and the access policy for the APIkey locally stored. Thus, advantageously providing techniques that can use the locally stored information without having to access the decision engine.

In addition to one or more of the features described above or below, or as an alternative, in further embodiments of the invention the method includes determining that the call is to be given access to the service based on the token list and the access policy for the APIkey locally stored comprises confirming that the token is on the token list and confirming that the access policy permits the APIkey to access the service, without contacting the access decision engine. Thus, this advantageously provides techniques that can use the locally stored information without having to access the decision engine.

In addition to one or more of the features described above or below, or as an alternative, in further embodiments of the invention the method includes monitoring for an APIkey revoke event. Thus, this advantageously provides techniques that can prevent misuse of the APIkey by immediately revoking the APIkey.

In addition to one or more of the features described above or below, or as an alternative, in further embodiments of the invention the method includes, in response to the APIkey revoke event being present, revoking the token list associated with the APIkey that has been revoked, thereby preventing the APIkey from further use. Thus, this advantageously provides techniques that can prevent misuse of the APIkey by immediately revoking the APIkey.

In addition to one or more of the features described above or below, or as an alternative, in further embodiments of the invention the method includes, in response to the APIkey revoke event being absent, permitting the token list locally stored to continue being used for determining access for the APIkey. Thus, this advantageously provides techniques that can quickly determine that access to services are permitted when there is no APIkey revoke event.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
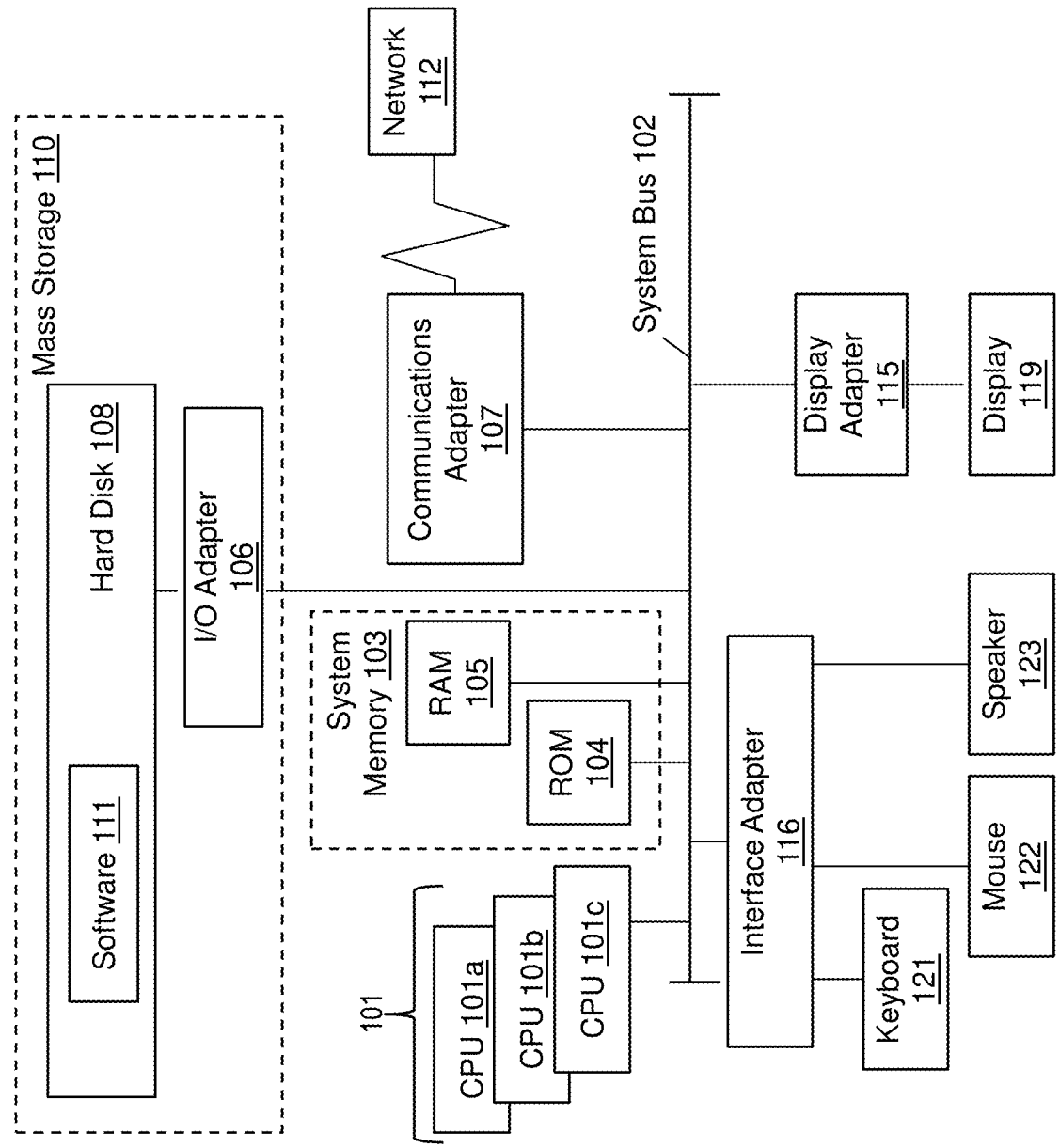
FIG. 1 depicts a block diagram of an example computer system for use in conjunction with one or more embodiments of the present invention.

One or more embodiments of the present invention provide computer-implemented methods, computer systems, and computer program products arranged and configured for progressively validating access token. As noted herein, a refresh token allows an application to obtain a new access token without prompting the user. However, there is case where the refresh token is revoked but the access token is still valid. To address this issue, some approaches may set a shorter lifetime or time to live for the access token or they may use interception to validate the access token using token buckets. One or more embodiments of the present invention progressively validate access tokens by using a sidecar to intercept the traffic to the service and by analyzing traffic to extract a token usage pattern and traffic type. For transactional traffic, one or more embodiments validate the token in the first service call of a transaction and save the time to live into a token transaction manager in a sidecar; for the successive traffic (i.e., successive and/or subsequent service calls for the transaction), one or more embodiments use a calculated time to live instead of talking to and/or communicating with an authentication server to perform validation. For the transaction with a commit or rollback, one or more embodiments of the present invention check the token again to finish the transaction. For access tokens which are generated using an application programming interface (API) key (APIkey), one or more embodiments build up and/or create the relationship between the APIkey and tokens that can be identified in a token list; use detected rules to validate the access token instead of talking to and/or communicating with an authentication server (or access decision engine) to validate every token; and check/monitor for an APIkey revoke event, and if the system finds that the APIkey was revoked, the token list associated with the revoked APIkey will be revoked as well.

Various technical benefits and technical solutions are provided by progressively validating the access token for a transaction. For example, the duration of the access token is not limited to a short period of time. One or more embodiments always capture the invalid token as early as possible, and the cost (e.g., time, requests to the authentication server, etc.) of validating the token is reduced. Further, one or more embodiments of the present invention can support multiple types of tokens. Moreover, the system for progressively validating the access token for a transaction greatly ensures security for a managed system and service and is therefore a technical solution to a technical problem, which cannot be performed in the human mind with or without the assistance of pen/paper. Further, the system for progressively validating the access token for a transaction can prevent or mitigate a malicious computer attack or intrusion, can prevent or mitigate a computer security threat, and it provides confidentially and security when computer systems are communicating with one another, thereby improving the functioning of a computer system itself as well as multiple computer systems interconnected in a cloud environment, thereby preventing further exposure to a potential or present computer issue.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
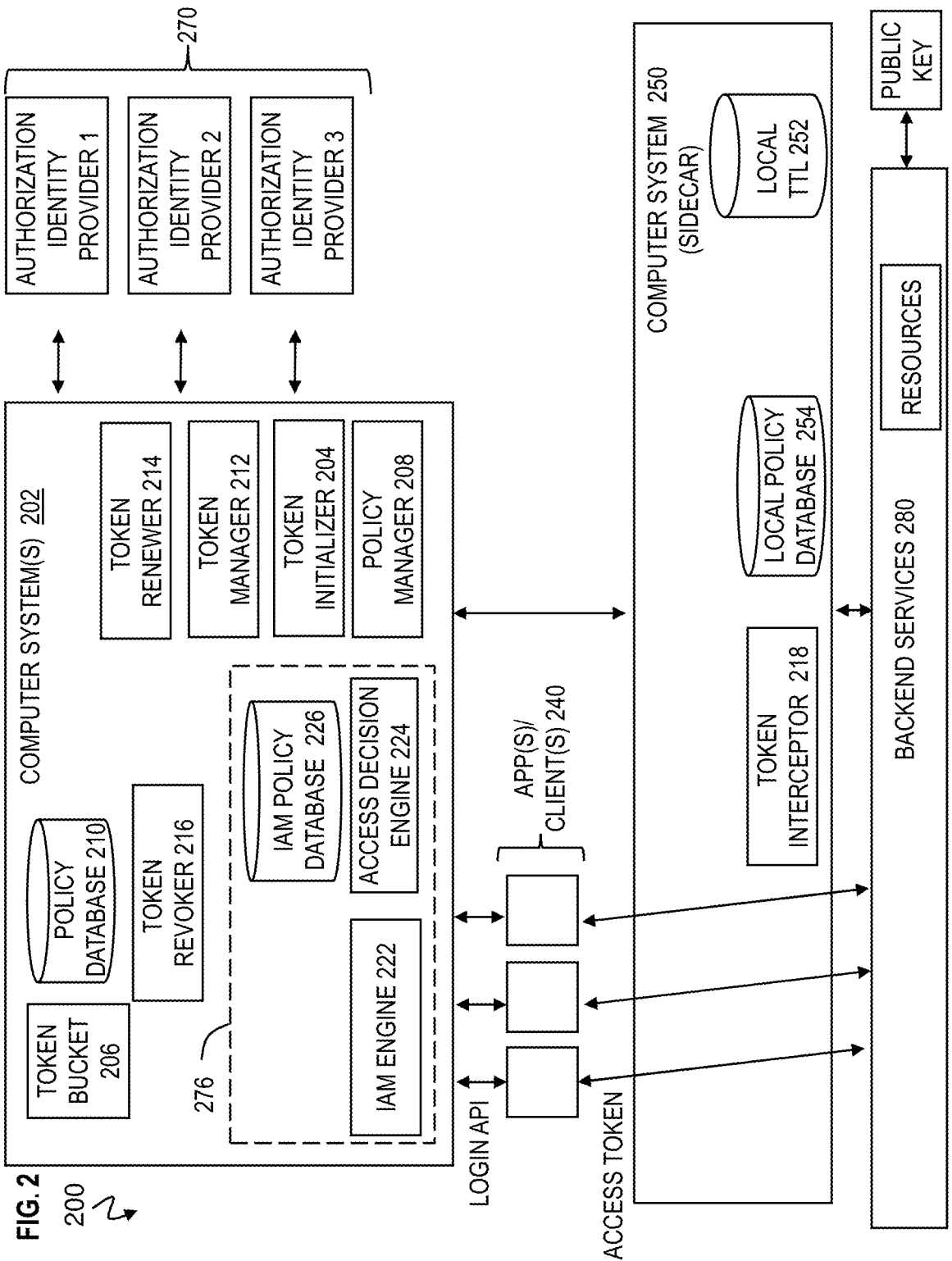
FIG. 2 depicts a block diagram of an example computing environment which is configured to progressively validate access token(s) according to one or more embodiments of the present invention.

FIG. 2 is a block diagram of an example computing environment 200 which is configured to progressively validate access token(s) according to one or more embodiments of the inventions. Computing environment 200 can include computer system(s) 202, sidecar computer system 250, client computer systems 240, authorization servers 270, and backend services computer systems 280, any of which may include any of the hardware and software components and functionality discussed in computer system 100 of FIG. 1. Computer environment 200 may be representative of one or more portions of a cloud computing environment. Functions of computing environment 200 can use and/or be implemented in workloads of workload layer 90 and any of the components of hardware and software layer 60 depicted in FIG. 17.

Figure 3:
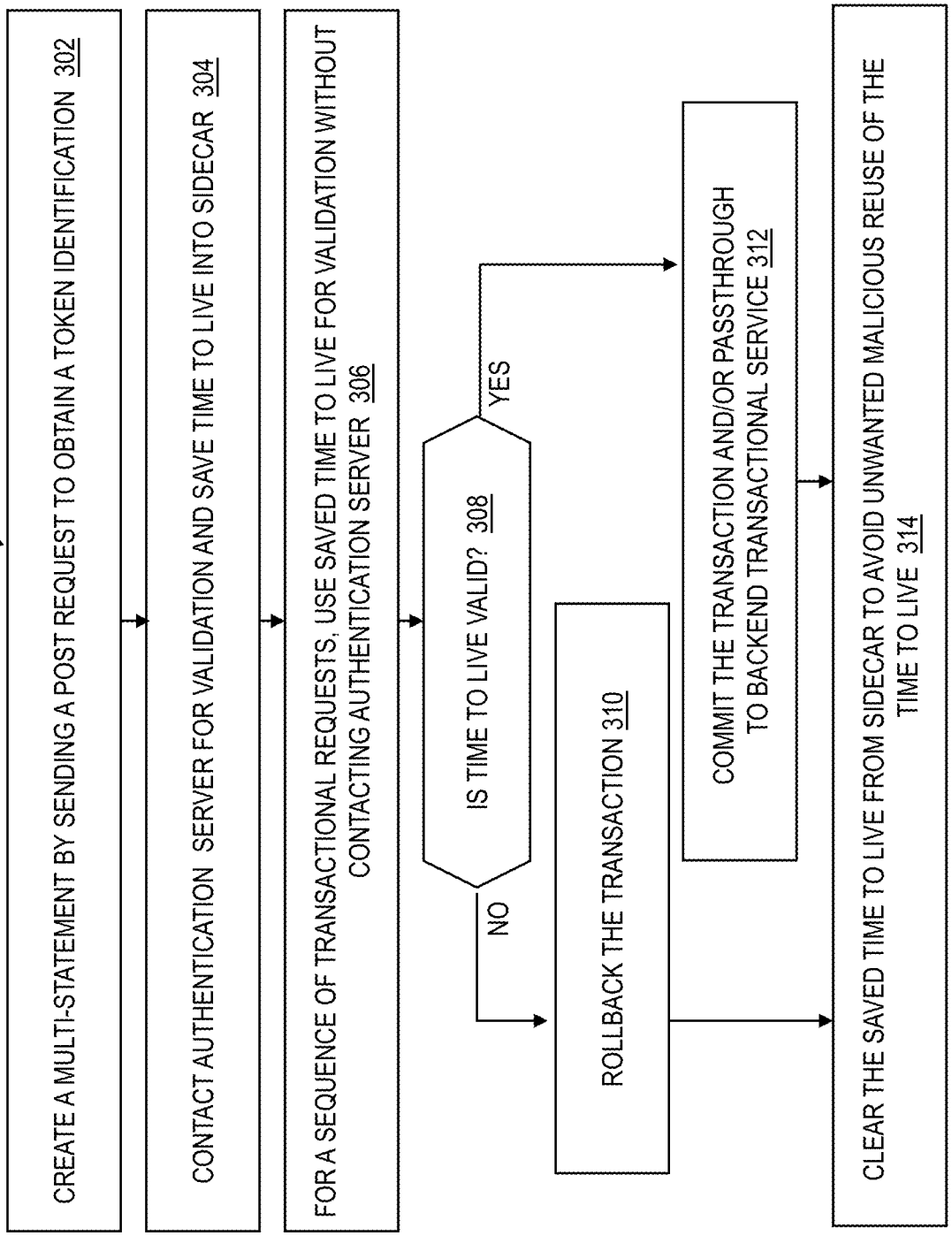
FIG. 3 is a flowchart of a computer-implemented process for intercepted transactional call interaction patterns according to one or more embodiments of the present invention.

FIG. 3 is a flowchart of a computer-implemented process 300 for intercepted transactional call interaction patterns in accordance with one or more embodiments. FIG. 3 may be explained using representational state transfer (REST) call interaction patterns, where REST is a software architectural style that was created to guide the design and development of the architecture for the World Wide Web. REST APIs provide a flexible, lightweight way to integrate applications and have emerged as the most common method for connecting components in microservices architectures. A REST API is an API that conforms to the design principles of the REST, or representational state transfer architectural style, and for this reason, REST APIs are sometimes referred to RESTful APIs.

In accordance with one or more embodiments, for each transaction, (only) the first transaction creation call will contact the authentication server for validation, unlike traditional transaction REST calls where all REST calls need to contact authentication servers for validation and/or some entity for validation.

At block 302 of computer-implemented process 300, when a client computer system 240 makes a REST call with an access token in the header for backend transaction services of backend services computer systems 280, token interceptor 218 of sidecar computer system 250 is configured to intercept a transactional REST call from a client computer system 240 to authentication servers 270 and create a multi-statement transaction by sending a POST request to obtain a transaction identification (ID) (also referred to as TID) from token computer system 202. The REST call is a transaction request for a transaction. In advance, client computer system 240 can log into token computer system 202 to obtain an access token for use with making the transactional REST. Client computer system 240 is representative of an actor, which could be an application, client, etc., running on computer system.

A transaction is a logical unit of work that is for performing activity. A transaction can be a set of one or more statements which either all fail or all succeed. A transaction can be an update transaction or a query (read-only) transaction, depending on the transaction type and the kind of statements in the transaction. A transaction may be a single-statement transaction or a multi-statement transaction, depending on the commit mode at the time it is created. When a transaction is created in a context in which the commit mode is set to explicit, the transaction will be a multi-statement transaction. The transaction ID may be a special set of numbers that defines each transaction.

A POST request is a request method supported by hypertext transfer protocol (HTTP) used by the World Wide Web. By design, the POST request method requests that a server accepts the data enclosed in the body of the request message. For example, POST requests are used to send data to the API server to create or update a resource. The data sent to the server is stored in the request body of the HTTP request.

At block 304, token interceptor 218 of sidecar computer system 250 is configured to contact authentication server 270 for validation of client computer system 240 (or client application computer system) using the transactional REST call to request a transaction with the access token and is configured to receive and save a time to live (TTL) for the access token associated with the client computer system 240. Although sidecar computer system 250 may contact authentication server 270 via token computer system 202, in one or more embodiments, sidecar computer system 250 may directly contact and communicate with authentication server 270. After receiving the time to live from token computer system 202, sidecar computer system 250 can save the time to live for the access token in a local TTL database 252. For explanation purposes, it is assumed that the first transaction creation call of the transaction is requested by client computer system 240. For subsequent and/or successive transaction call/requests for the (same) transaction by client computer system 240, sidecar computer system 250 does not, client computer system 240 does not, and backend services computer systems 280 do not have to contact authentication server 270 and/or token computer system 202 for validation.

At block 306, for a sequence of transactional call/requests for the transaction desired by client computer system 240, sidecar computer system 250 is configured to use the saved time to live in local TTL database 252 for validation of the associated access token for the transaction without contacting the authentication server 270 for validation of the access token. For example, client computer system 240 may send a subsequent call for the transaction to backend services computer systems 280 using the (same) access token, where the subsequent call/request for the transaction is after the first call for the transaction that required sidecar computer system 250 to initially contact the authentication servers 270 for validation. Upon intercepting the subsequent call/request from client computer system 240 to backend services computer system 280, sidecar computer system 250 is configured to parse and recognize that the access token is utilized for a service call/request of the transaction, which is subsequent to the first service call. As such, sidecar computer system 250 can search local TTL database 252 for the access token to confirm that this is a subsequent service call/request. In one or more embodiments, sidecar computer system 250 is configured to prevent token computer system 202 from contacting authentication severs 270 for validation of the access token for the subsequent call/request and/or prevent backend services computer system 250 from contacting authentication severs 270 for validation of the access token for the subsequent call/request. Instead, sidecar computer system 250 is configured to check that the time to live in local TTL database 252 for the access token is still valid without contacting authentication servers 270 and/or causing authentication servers 270 to be contacted at block 308. For example, sidecar computer system 250 is configured to check whether the time to live in local TTL database 252 for the access token has expired.

At block 310, when the time to live for the access token associated with the subsequent call/request for the transaction is no longer valid (i.e., expired), sidecar computer system 250 is configured to roll back the transaction, such that any potential changes to one or more resources of backend services computer systems 280 are not committed and do not take effect.

At block 312, when the time to live for the access token associated with the subsequent call/request for transaction is still valid (i.e., not expired), sidecar computer system 250 is configured to commit the transaction, thereby committing the changes to one or more resourced of backend services computer systems 280. In transaction systems, commit and rollback refer to the set of actions used to ensure that an application program either makes all changes to the resources represented by a single unit of recovery (UR) or makes no changes at all. Moreover, subsequent calls/request for the transaction (i.e., any service call/request for transaction after the first service call/request for transaction) using the same access token are allowed direct passthrough to backend transactional services by backend services computer system 280, after the time to live is confirmed as being not expired.

In one or more embodiments, sidecar computer system 250 may include the function of an HTTP proxy, in order to redirect the original client POST request to backend services computer systems 280 (e.g., the backend server). From the backend services perspective, backend services computer systems 280 does not know that this POST request is from sidecar computer system 250, and the POST request is received as though it were from client computer system 240. Backend services computer system 280 generates the transaction identification and then sends back a response. Sidecar computer system 250 intercepts the response, records transaction identification in local TTL database 252, and associates the transaction identification with the saved TTL for the token; sidecar computer system 250 proxies back the response to client computer system 240. The transaction having the transaction identification is created by client computer system 240. Sidecar computer system 250 intercepts and obtains the transaction identification and TTL of the subsequent transactional calls (with the transaction identification in the header), which are then matched to the saved transaction identification in local TTL database 252 to obtain the TTL without accessing authentication server 270.

Figure 4:
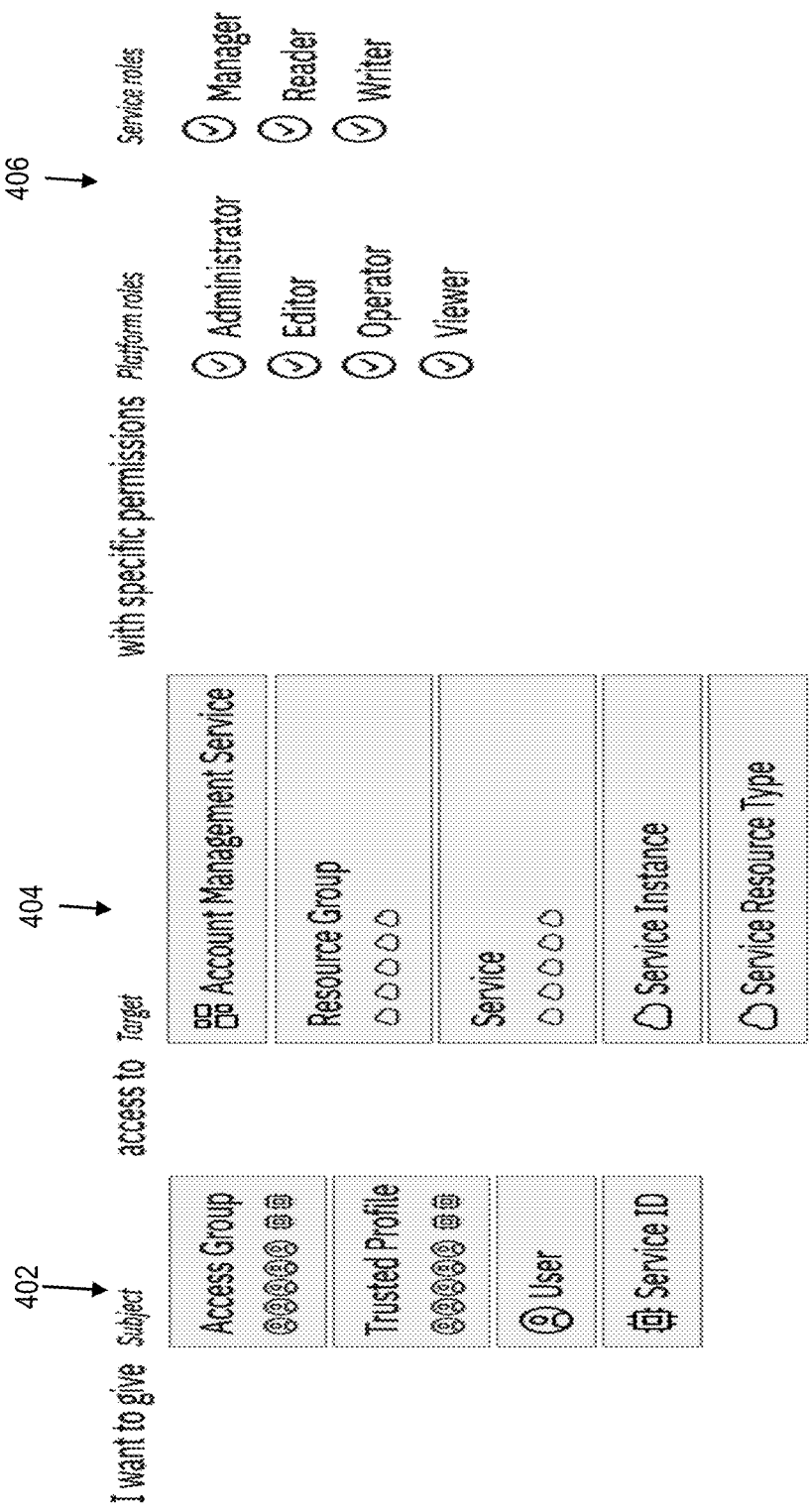
FIG. 4 depicts a block diagram illustrating an example of a sidecar computer system as a token interceptor for use with an Identity and Access Management (IAM) policy according to one or more embodiments of the present invention.

FIG. 4 is a block diagram illustrating an example of sidecar computer system 250 as a token interceptor for use with an Identity and Access Management (IAM) policy in accordance with one or more embodiments. In this example, IAM system 276 can be utilized to include an IAM engine 222, access decision engine 224, and IAM policy database 226. IAM engine 222 and access decision engine 224 may be one or more software applications and/or modules executing on token computer system 202. Although the IAM system 276 is depicted in token computer system 202, in one or more embodiments, IAM system 276 may be partially on token computer system 202 or completely on a separate computer system from token computer system 202. Using an IAM policy management API, IAM engine 222 can create, update, view, and delete IAM policies in an IAM policy database 226. An IAM policy enables a subject to access a resource. These policies are used in access decisions when client computer systems call APIs for IAM-enabled services.

In FIG. 4, an IAM policy executed by IAM engine 222 usually uses an APIkey to generate the access token. As seen in FIG. 4, the access token defines a subject access (e.g., field 402) to target (e.g., field 404) with specific permission (e.g., field 406). Typically, every call with the access token into backend services computer system 280 needs to request access decision engine 224 to decide whether the call is allowed or denied. However, analogous to the description of FIG. 3 for authentication servers 270 but instead using access decision engine 224 in IAM system 276, token interceptor 218 of sidecar computer system 250 is configured to reduce the token validation access (amount) to access decision engine 224 of IAM system 276 in accordance with one or more embodiments and reduce the risk of access token misuse when the attached APIkey is revoked.

Figure 5:
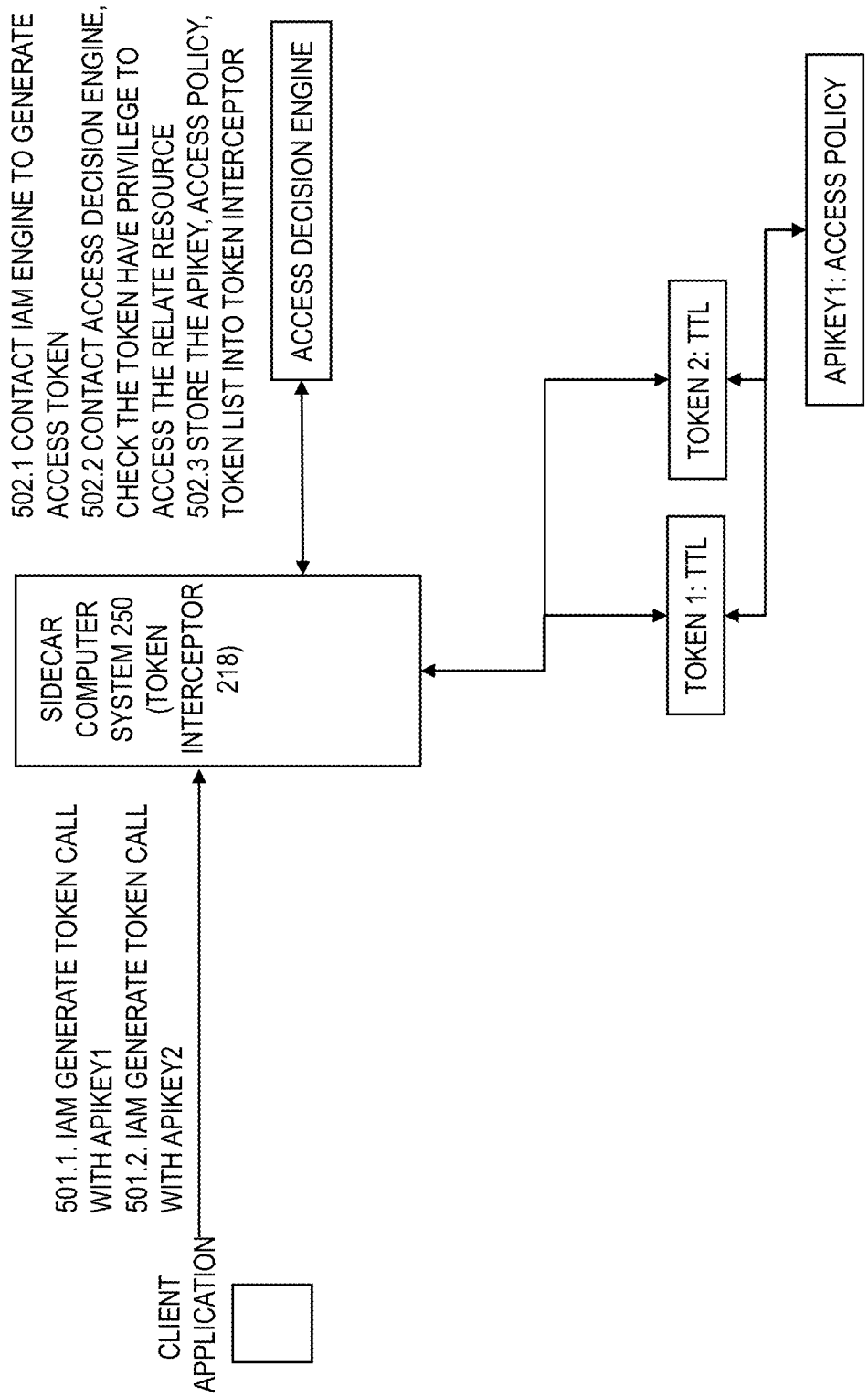
FIG. 5 depicts a block diagram further illustrating the example of sidecar computer system as the token interceptor for use with the IAM policy according to one or more embodiments of the present invention.

FIG. 5 is a block diagram further illustrating the example of sidecar computer system 250 as the token interceptor for use with an IAM policy of IAM system 276 in accordance with one or more embodiments. At action 501.1, token interceptor 218 of sidecar computer system 250 is configured to intercept a first IAM generate token call with APIkey1 from a client computer system 240 intended for IAM system 276 of token computer system 202. At action 501.2, token interceptor 218 of sidecar computer system 250 is configured to intercept a second IAM generate token call with APIkey2 from a client computer system 240 intended for IAM system 276 of token computer system 202. In one or more embodiments, IAM system 276 can inform token interceptor 218 of sidecar computer system 250 of the IAM generate token call with APIkey1, APIkey 2.

At action 502.1, token interceptor 218 of sidecar computer system 250 is configured to contact IAM engine 222 of IAM system 276 to generate the access token for the IAM generate token call for APIkey 1 (and similarly for APIkey 2). IAM engine 222 may generate tokens which are identified in a token list. At action 502.2, token interceptor 218 of sidecar computer system 250 is configured to contact access decision engine 224 of IAM system 276 to check that the generated access token(s) has privilege to access the related resource of backend services computer system 280. At action 502.3, sidecar computer system 250 is configured to store the APIkey (e.g., APIkey1, APIkey 2), access policy including the privilege (and type of privileges for the tokens in the token list) from access decision engine 224, and token list into a local policy database 254 for sidecar computer system 250.

Token interceptor 218 builds and/or creates an association between the tokens in the token list, their access policy to targeted resources, and the APIkey in the local policy database 254, such that each time the APIkey and its token is identified in a service call/request this additional data is retrieved from local policy database 254 and applied to grant or deny access to the targeted resource. FIG. 5 shows that sidecar computer system 250 has local access to token 1, token 2, as well as the access policy for APIkey1 which are utilized to grant or deny access to backend services of backend services computer system 280 for client computer system 240 in this example scenario.

Figure 6:
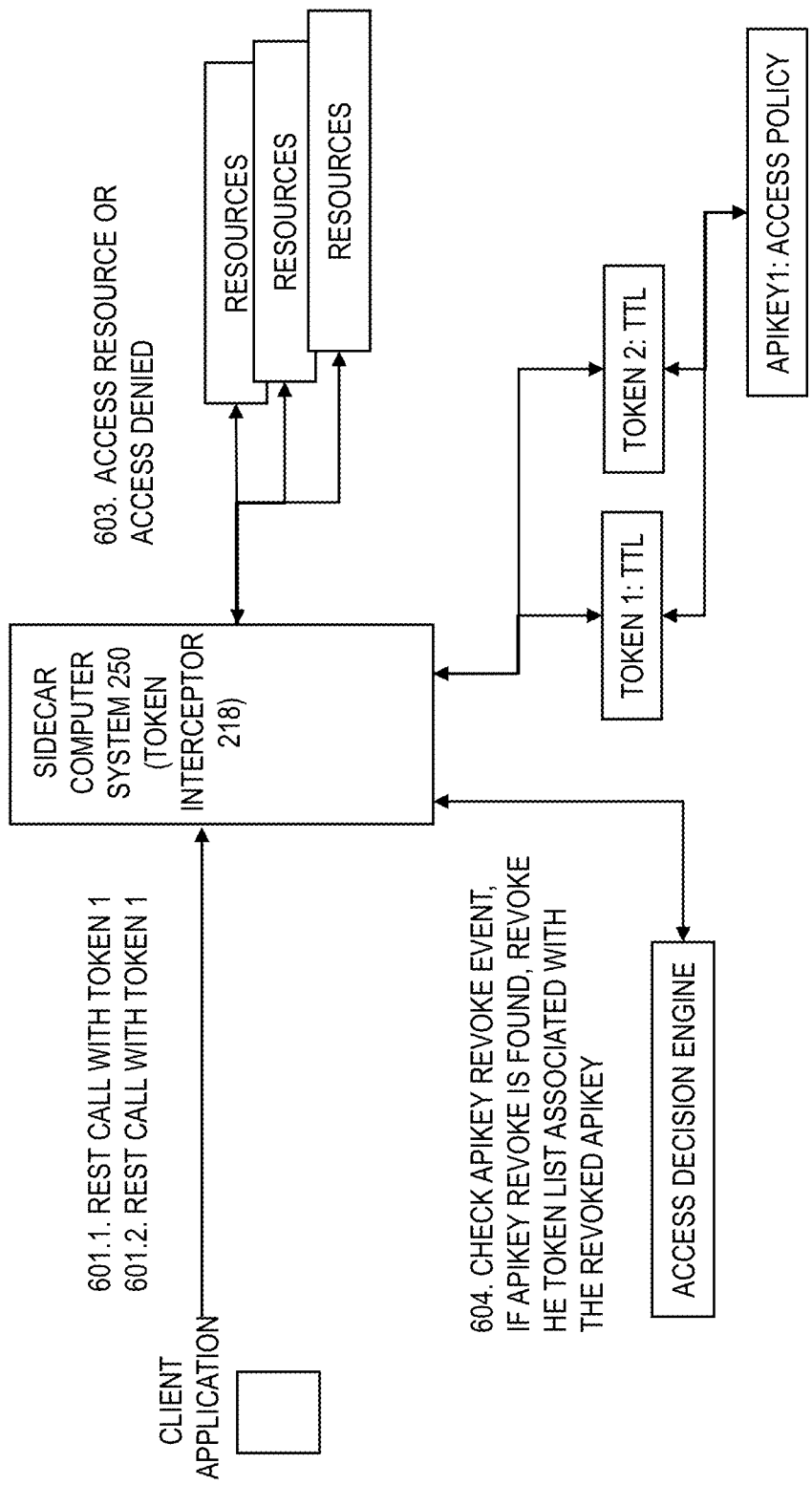
FIG. 6 depicts a block diagram further illustrating the example of sidecar computer system as the token interceptor for use with the IAM policy according to one or more embodiments of the present invention.

FIG. 6 is a block diagram further illustrating the example of sidecar computer system 250 as the token interceptor for use with the IAM policy in accordance with one or more embodiments. Analogous to the description of FIG. 3 for authentication servers 270, FIG. 6 illustrates use transactional REST calls. It should be appreciated that one or more embodiments may be applied to other types of service calls.

At action 601.1, token interceptor 218 of sidecar computer system 250 is configured to intercept a transactional REST call with token 1 for APIkey 1 from client computer system 240 to backend services computer system 280. At action 601.2, sidecar computer system 250 is configured to intercept a transactional REST call with token 2 for APIkey 1 from client computer system 240 to backend services computer system 280.

At action 602, sidecar computer system 250 is configured to check the token access privilege in the local token list in local policy database 254 for the access token (e.g., for token 1, and token 2 for APIkey 1). According to the token access policy (privilege) in local token list in local policy database 254, token interceptor 218 of sidecar computer system 250 determines whether the requested transaction with the access token and APIkey is allowed or not allowed.

At action 603, token interceptor 218 of sidecar computer system 250 is configured to either allow access to the resource of backend services computer system 280 or deny access to the resource of backend services computer system 280 according to whether the access token for the APIkey (e.g., for APIkey 1) is granted access or denied access in the local token list in local policy database 254.

At action 604, token interceptor 218 of sidecar computer system 250 is configured to continuously check/monitor for an APIkey revoke event, and if sidecar computer system 250 finds that the APIkey is revoked, sidecar computer system 250 is configured to revoke/remove the token list associated with the revoked APIkey, thereby blocking access to the targeted resource of backend services computer system 250. For example, the APIkey revoke events can be pushed from IAM engine 222, and/or the APIkey revoke events can be pulled from IAM engine 222. IAM engine 222 can use a standard method to revoke an APIkey (such as APIkey 1). Revoke APIkey may be an action initiated by the administrator, usually from cloud graphical user interface (GUI) coupled to token computer system 202 (e.g., in communication with IAM engine 222), and the revoke APIkey action generates the APIkey revoke event; the APIkey revoke event is monitored for, and upon its occurrence, sidecar computer system 250 revokes all tokens relate to this APIkey. As seen in FIGS. 4, 5, and 6, sidecar computer system 250 as the token interceptor is configured to reduce the token validation access to access decision engine of IAM system 276 in accordance with one or more embodiments and reduce the risk of access token misuse when the attached APIkey is revoked.

Figure 7:
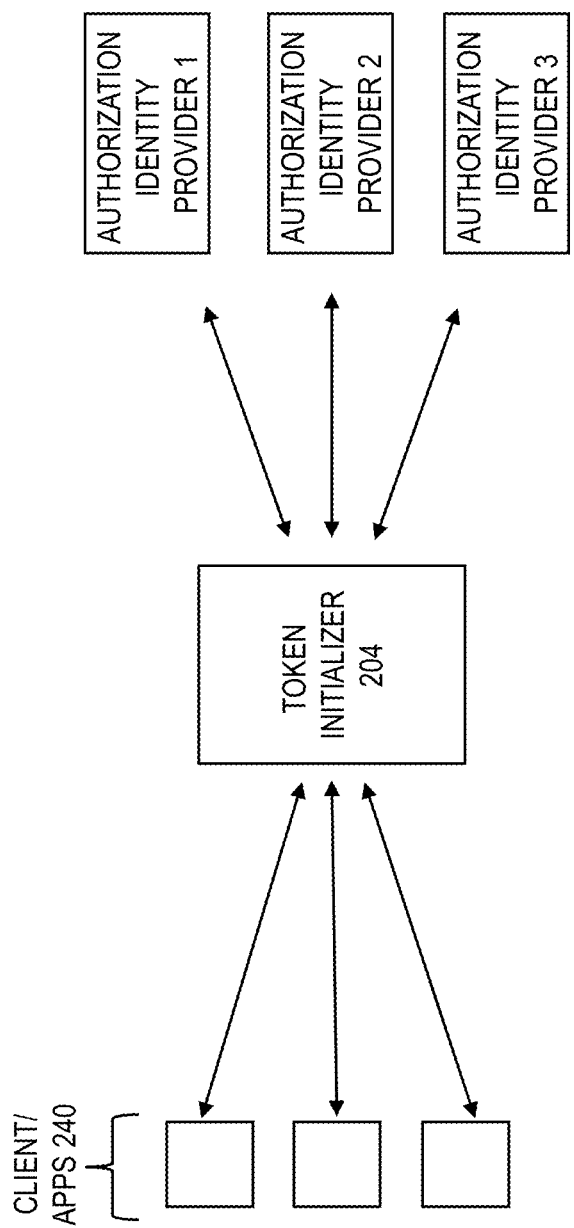
FIG. 7 depicts a block diagram illustrating a token initializer in according to one or more embodiments according to one or more embodiments of the present invention.

FIG. 7 is a block diagram illustrating a token initializer in accordance with one or more embodiments. Token initializer 204 can represent one or more software applications and/or modules executing on token computer system 202. Token initializer 204 is configured to accept the login request from a client computer system 240 (e.g., an actor) and get an access token and refresh token from an authorization identify provider such as one of the authorization servers 270. Token initializer 204 is configured to get a new access token using a refresh token once the access token expires, i.e., once the time to live expires. Additionally, the token initializer 204 is configured to store the refresh token in a token bucket 206 for further usage.

Figure 8:
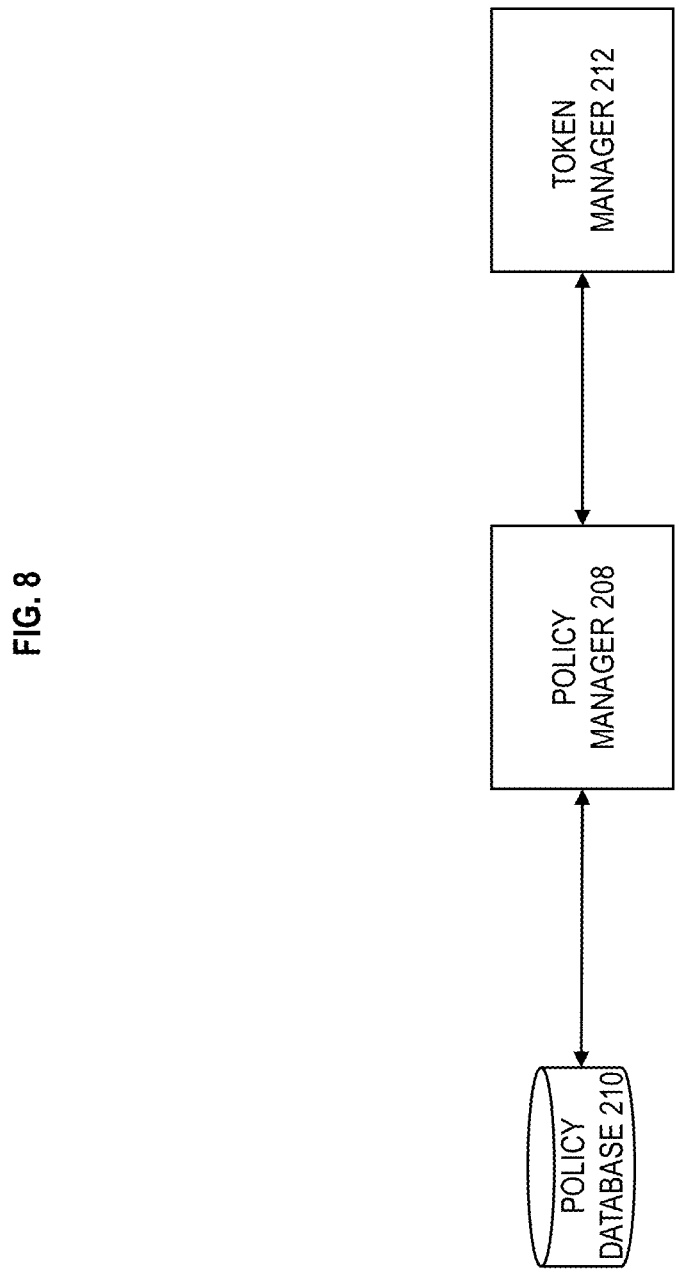
FIG. 8 depicts a block diagram illustrating a policy manager according to one or more embodiments of the present invention.

FIG. 8 is a block diagram illustrating a policy manager in accordance with one or more embodiments. Policy manager 208 can represent one or more software applications and/or modules executing on token computer system 202. Policy manager 208 is configured to parse the policies defined in policy database 210, provide input to token manager 212 to apply policy to the access token and refresh token, and analyze the pattern in the existing token group to generate a new potential token policy.

Figure 9:
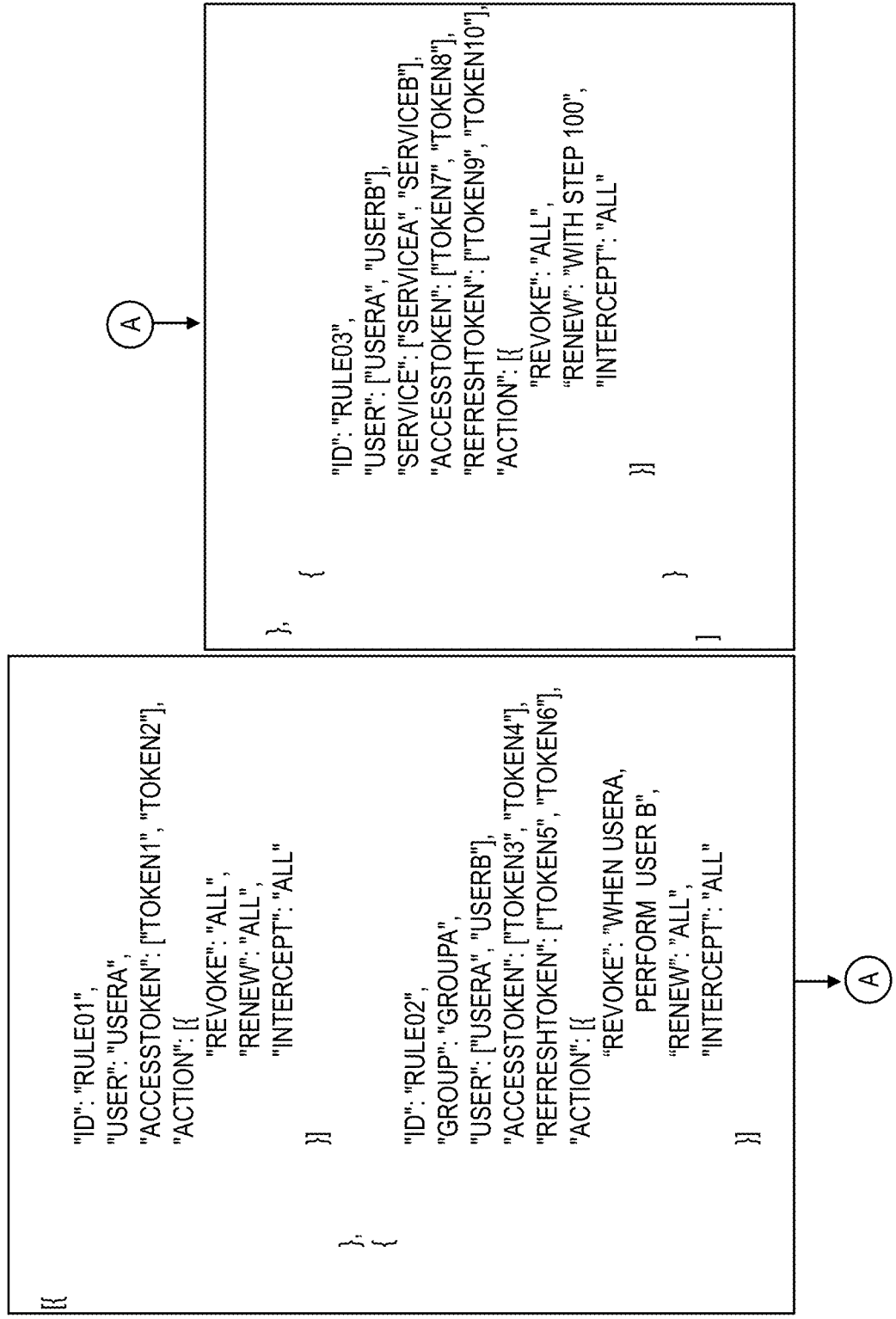
FIG. 9 depicts a block diagram illustrating examples of rules in a policy database according to one or more embodiments of the present invention.

Turning to further details regarding policy database 210, the policy database 210 has entities which include actor (e.g., client computer system 240): user or group; access token and/or refresh token; service: use token to access managed resource in service; and condition: decide the trigger situation. Additionally, the policy database 210 has rules which include how and when to renew access token; how and when to revoke the access token and refresh token; access tokens and/or refresh tokens for one user to follow; access tokens and/or refresh tokens for one group to follow; and access tokens and/or refresh tokens for a service group to follow. As defined in the policy database 210, each token and/or token group can be applied for different combinations of different rules, in order to implement various token actions for the user and service. To depict policies in policy database 210, FIG. 9 is a block diagram illustrating examples of rules in policy database 210 in accordance with one or more embodiments.

Figure 10:
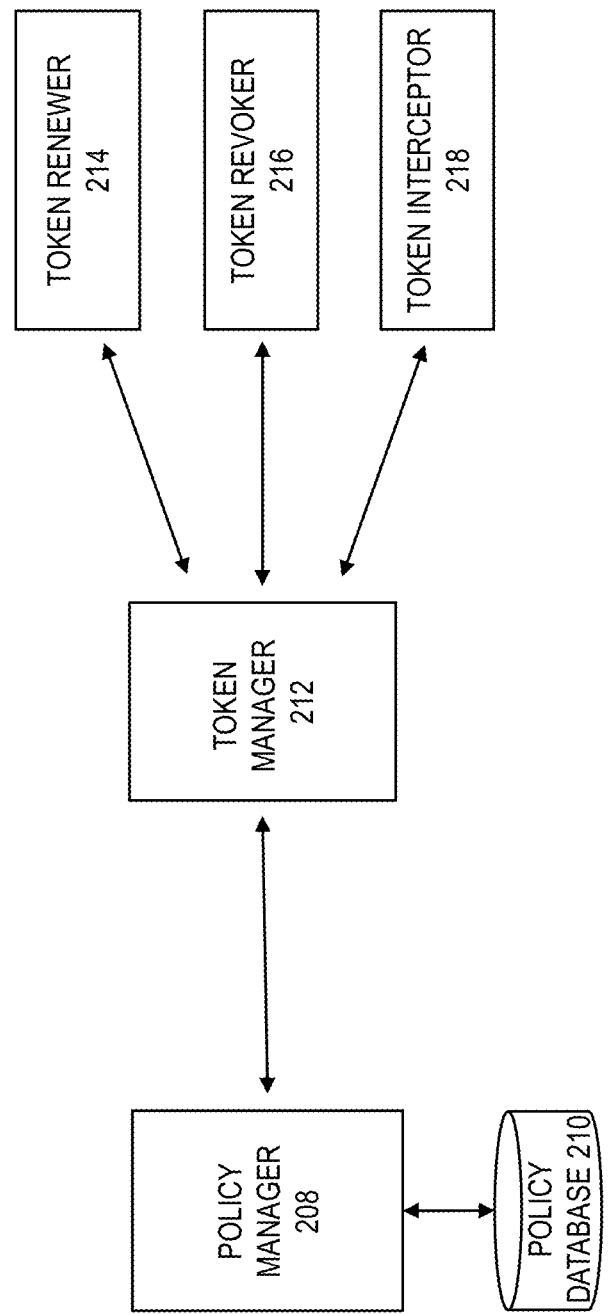
FIG. 10 depicts a block diagram illustrating a token manager according to one or more embodiments of the present invention.

FIG. 10 is a block diagram illustrating a token manager in accordance with one or more embodiments. Token manager 212 can represent one or more software applications and/or modules executing on token computer system 202. Token manager 212 is configured to manage tokens according to a policy defined in policy database 210 and is configured to call token renewer 214 detailed further in FIG. 11, token revoker 216 detailed further in FIG. 12, and token interceptor 218 to manage the life cycle (i.e., time to live) of tokens for a single user and/or multiple users.

Figure 11:
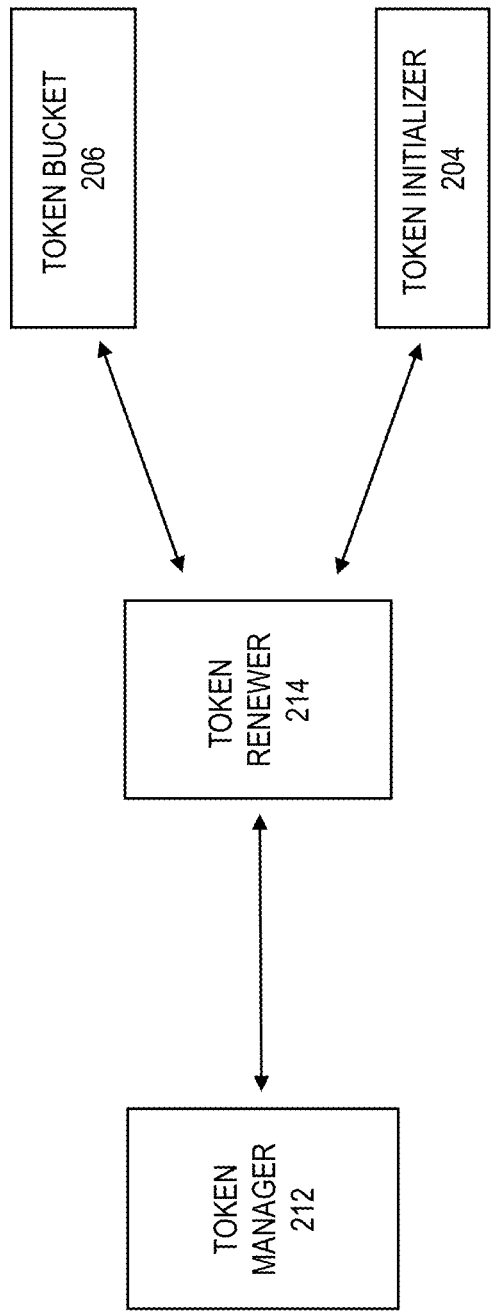
FIG. 11 depicts a block diagram illustrating a token renewer according to one or more embodiments of the present invention.

FIG. 11 is a block diagram illustrating a token renewer 214 in accordance with one or more embodiments. Token renewer 214 can represent one or more software applications and/or modules executing on token computer system 202. Token renewer 214 is configured to renew a token's duration (i.e., time to live), extending the amount of time it can be used, and obtain a renewed access token by using the refresh token.

Figure 12:
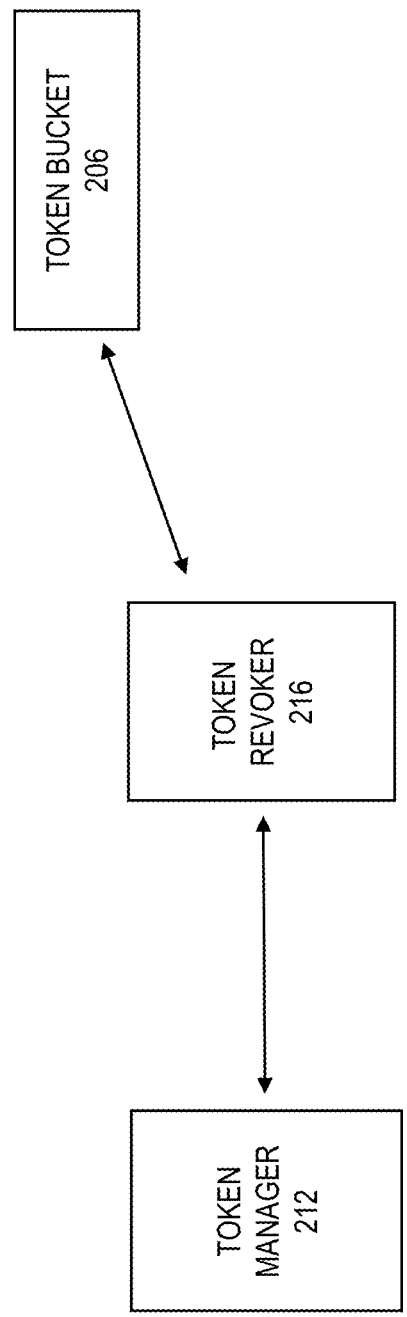
FIG. 12 depicts a block diagram illustrating a token revoker according to one or more embodiments of the present invention.

FIG. 12 is a block diagram illustrating a token revoker 216 in accordance with one or more embodiments. Token revoker 216 can represent one or more software applications and/or modules executing on token computer system 202. Token revoker 216 is configured to explicitly revoke and/or invalidate tokens in token bucket 206 according to instructions and/or policies enforced by token manager 212. Token revoker 216 is configured to revoke the access token if (only) the access token is not valid and revoke both the access token and refresh token if the refresh token is not valid.

Figure 13:
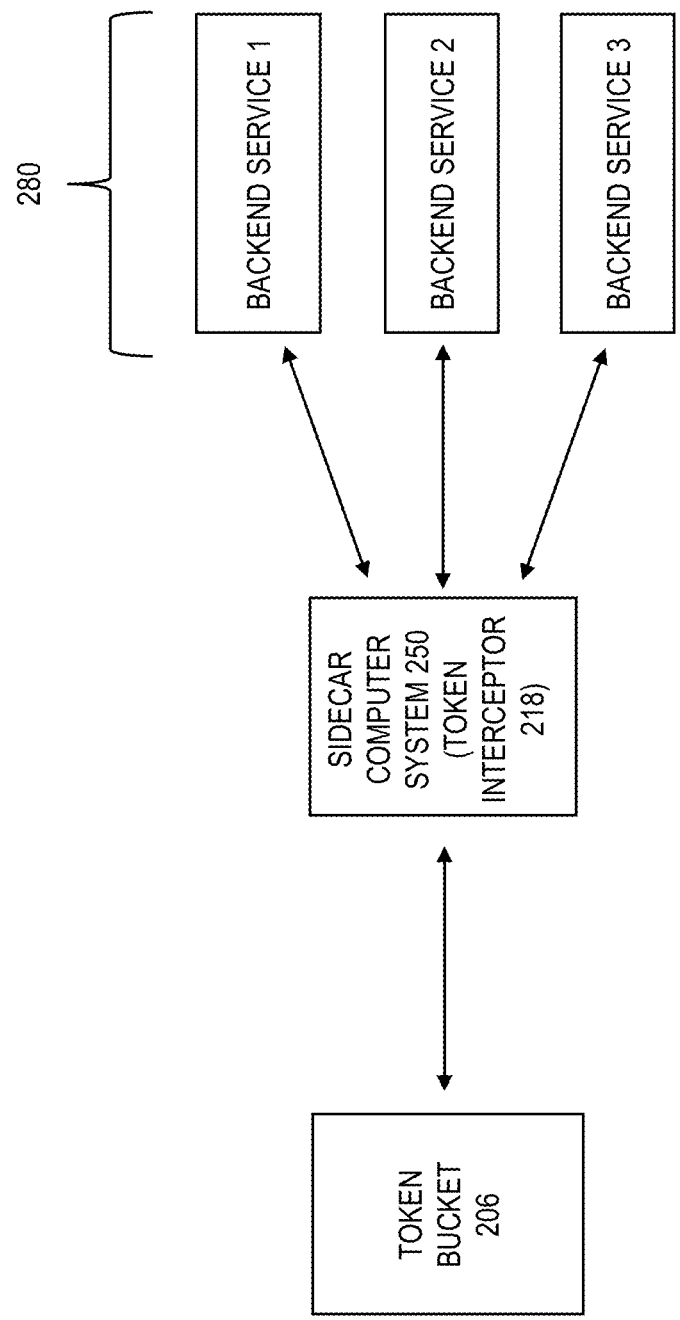
FIG. 13 depicts a block diagram illustrating token interceptor according to one or more embodiments of the present invention.

FIG. 13 is a block diagram illustrating token interceptor 218 in accordance with one or more embodiments. Token interceptor 218 can represent one or more software applications and/or modules executing on sidecar computer system 250. Token interceptor 218 is configured to intercept the API call with HTTP Authorization headers and uniform resource identifier (URI) query parameters from client computer system 240, validate the token using information stored in token bucket 206, and pass through the request (i.e., API call with HTTP Authorization headers and URI query parameters) to backend service of backend services computer systems 280 or reject the request due to an expired token.

Figure 14:
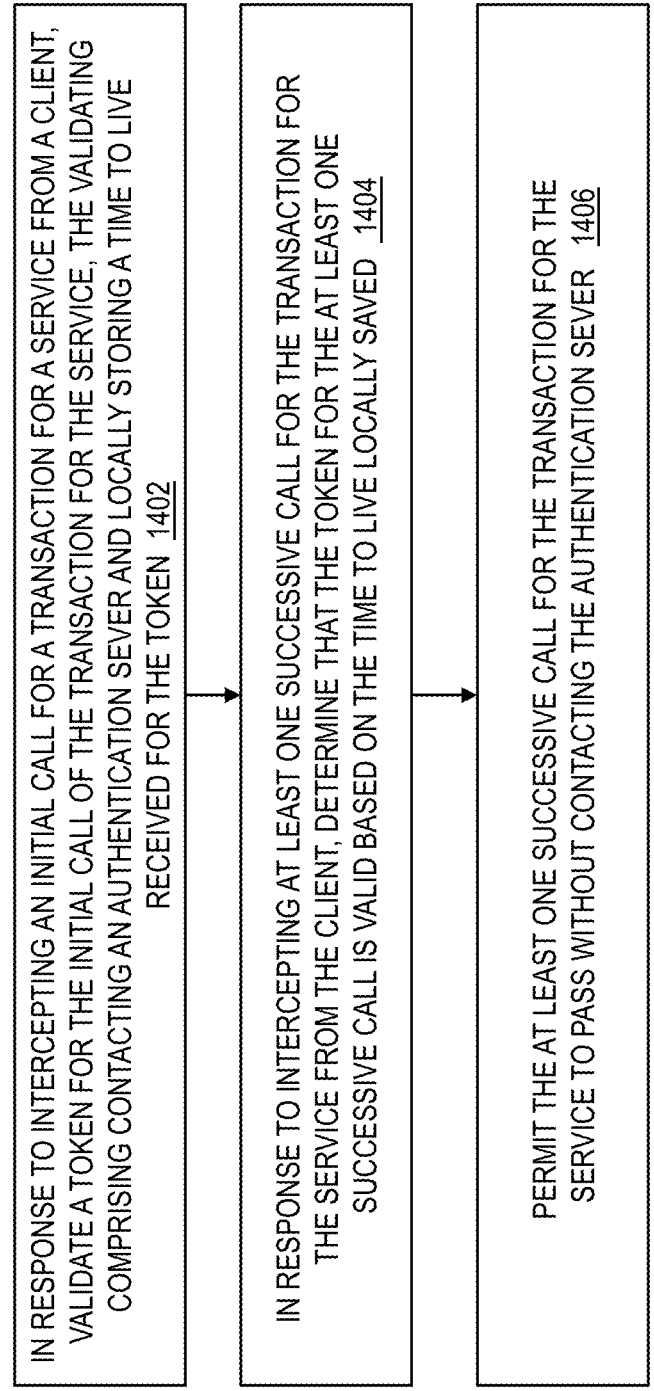
FIG. 14 is a flowchart of a computer-implemented method for progressively validating tokens to allow a transaction with backend services according to one or more embodiments of the present invention.

FIG. 14 is a flowchart of a computer-implemented method 1400 for progressively validating access token to allow a transaction with backend services computer system 280 in accordance with one or more embodiments of the invention. Computer-implemented method 1400 may be performed using sidecar computer system 250 in FIG. 2. Functions of computer systems can use and/or implemented in hardware components of hardware and software layer 60 and/or workloads of workload layer 90 depicted in FIG. 17.

At block 1402 of computer-implemented method 1400, token interceptor 218 (e.g., one or more software applications) of sidecar computer system 250 is configured to, in response to intercepting an initial call for a transaction for a service from a client (e.g., from a client computer system 240 to backend services computer system 280), validate a token for the initial call of the transaction for the service, the validating including (this sidecar computer system 250) contacting an authentication sever 270 and locally storing a time to live (e.g., in local TTL database 252) received for the token.

At block 1404, token interceptor 218 of sidecar computer system 250 is configured to, in response to intercepting at least one successive call for the transaction for the service from the client (e.g., from client computer system 240 to backend services computer system 280), determine that the token for the at least one successive call is valid based on the time to live locally saved in local TTL database 252.

At block 1406, token interceptor 218 of sidecar computer system 250 is configured to, permit the at least one successive call for the transaction for the service to pass (e.g., to backend services computer system 280 in order to perform at least one action on one or more resources managed by backend services computer system 280) without contacting the authentication sever 270.

In one or more embodiments, token interceptor 218 of sidecar computer system 250 is configured to determine that the at least one successive call is a last call for the transaction and commit the transaction. The initial call and each of the successive calls (including the last successive call) for the transaction use the same token.

Token interceptor 218 of sidecar computer system 250 is configured to determine that the token for a last successive call is invalid based on the time to live locally saved in local TTL database 252 having expired, prevent the last successive call for the transaction for the service from passing, and roll back the transaction. For example, token interceptor 218 checks the time to live in local TTL database 252 to confirm that the time to live has expired, which means that the token is invalid. Accordingly, token interceptor 218 prevents the last successive call from passing to backend services computer system 280 and/or prevent backend services computer system 280 from processing the last successive call. Further, token interceptor 218 rolls back the transaction which includes any previous calls of the transaction.

Token interceptor 218 of sidecar computer system 250 is configured to, in response to committing the transaction or rolling back the transaction, clear/remove the time to live for the token from the local TTL database 252, thereby avoiding unauthorized reuse of the token.

Determining that the token for the at least one successive call is valid based on the time to live locally saved in local TTL database 252 includes preventing a backend services computer system 280 from contacting the authentication sever 270 (e.g., via token computer system 202) for validation of the token for the at least one successive call. Determining that the token for the at least one successive call is valid based on the time to live locally saved in local TTL database 252 avoids requiring a backend services computer system 280 from contacting the authentication sever 270 (e.g., via token computer system 202) for validation of the token for the at least one successive call. The transaction causes modification to at least one resource associated with a backend services computer system 280.

Figure 15:
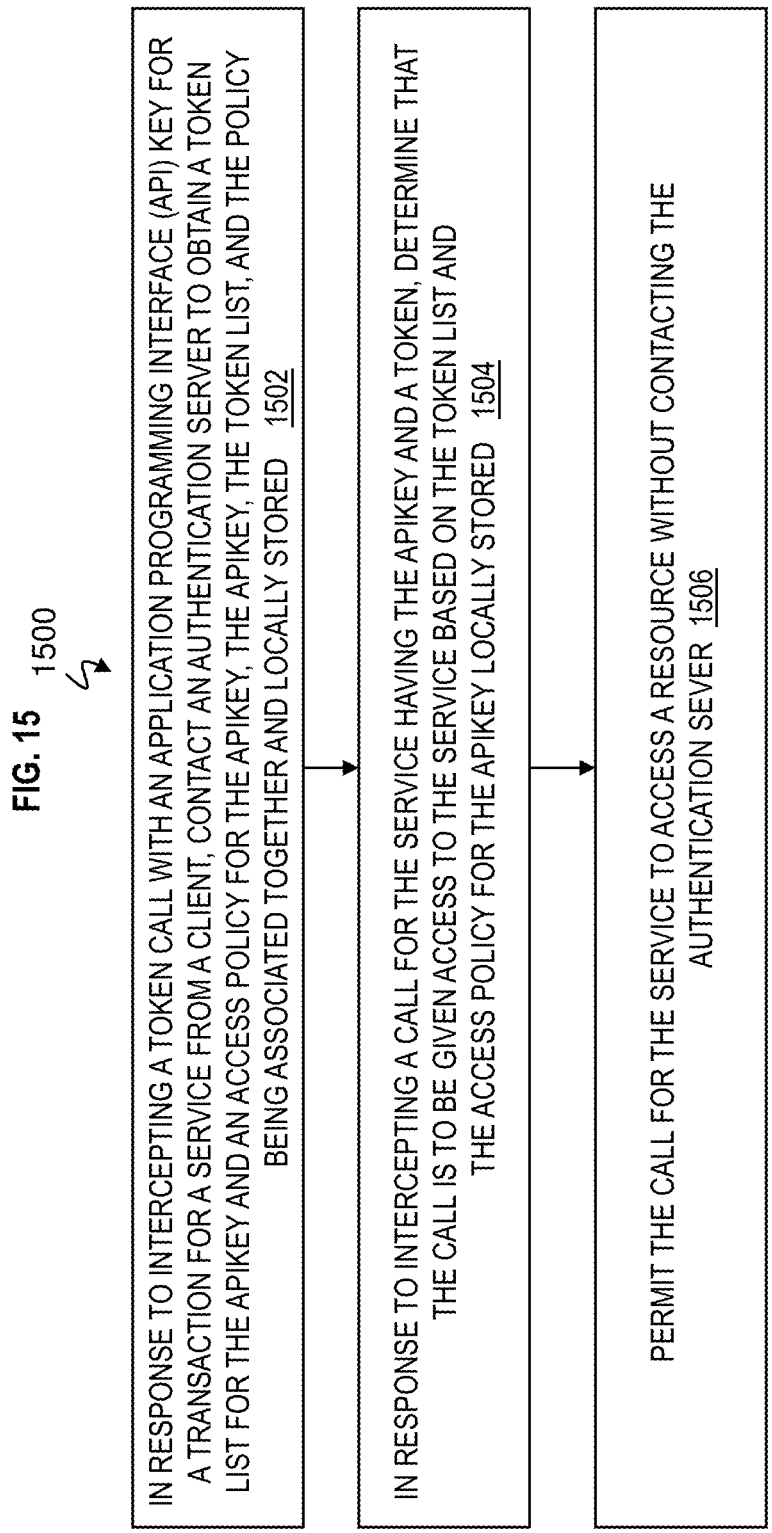
FIG. 15 is a flowchart of a computer-implemented method for progressively validating tokens to allow a transaction with and/or access to backend services according to one or more embodiments of the present invention.

FIG. 15 is a flowchart of a computer-implemented method 1500 for progressively validating access token to allow a transaction with and/or access to backend services computer system 280 in accordance with one or more embodiments of the invention. Computer-implemented method 1500 may be performed using sidecar computer system 250 in FIG. 2. Functions of computer systems can use and/or implemented in hardware components of hardware and software layer 60 and/or workloads of workload layer 90 depicted in FIG. 17.

At block 1502 of computer-implemented method 1500, token interceptor 218 (e.g., one or more software applications) of sidecar computer system 250 is configured to, in response to intercepting a token call with an application programming interface (API) key for a transaction for a service from a client (e.g., client computer system 240), contact an authentication server 270 (e.g., IAM engine 222 and access decision engine 224) to obtain a token list for the APIkey and an access policy for the APIkey, the APIkey, the token list, and the policy being associated together and locally stored in local policy database 254. For example, token interceptor 218 can use the intercepted token call with the APIkey to contact the IAM engine 222 to generate the access token(s) and contact the access decision engine 224 to obtain access policy for the generated tokens, all of which is stored in local policy database 254.

At block 1504, token interceptor 218 is configured to, in response to intercepting a call for the service having the APIkey and a token previously generated, determine that the call is to be given access to the service based on the token list and the access policy for the APIkey locally stored in local policy database 254. For example, token interceptor 218 checks local policy database 254 to confirm that the call should be given access to the desired service on backend services computer system 280, without contacting the authentication sever 270.

At block 1506, token interceptor 218 is configured to permit the call for the service to access a resource on backend services computer system 280 without contacting the authentication sever 270.

Token interceptor 218 is configured to determine that a subsequent call for the service having the APIkey and another token is to be given access to the service based on the token list and the access policy for the APIkey locally stored in local policy database 254. Determining that the call is to be given access to the service based on the token list and the access policy for the APIkey locally stored in local policy database 254 includes confirming that the token is on the token list and confirming that the access policy permits the APIkey to access the service, all without contacting the authentication sever 270. Token interceptor 218 is configured to monitor for an APIkey revoke event, for example, by checking with authentication server 270 (e.g., pushing and/or pulling).

Token interceptor 218 is configured to, in response to the APIkey revoke event being present, revoke the token list associated with the APIkey that has been revoked, thereby preventing the APIkey from further use. Token interceptor 218 is configured to, in response to the APIkey revoke event being absent, permit the token list locally stored in in local policy database 254 to continue being used for determining access for the APIkey.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 16:
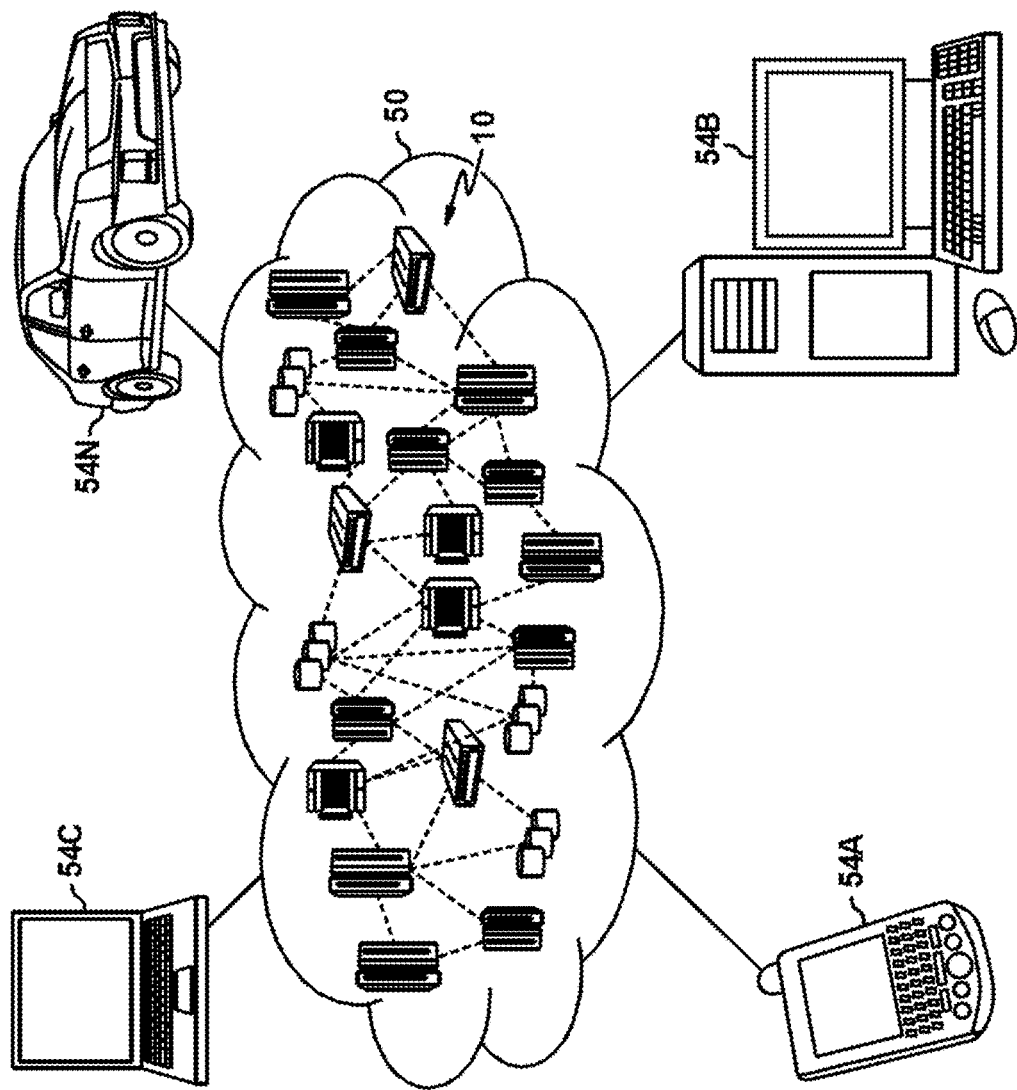
FIG. 16 depicts a cloud computing environment according to one or more embodiments of the present invention.

Referring now to FIG. 16, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 16 are intended to be illustrative only and that computing nodes 10 and cloud computing environment 50 can communicate with any type of computerized device over any type of network and/or network addressable connection (e.g., using a web browser).

Figure 17:
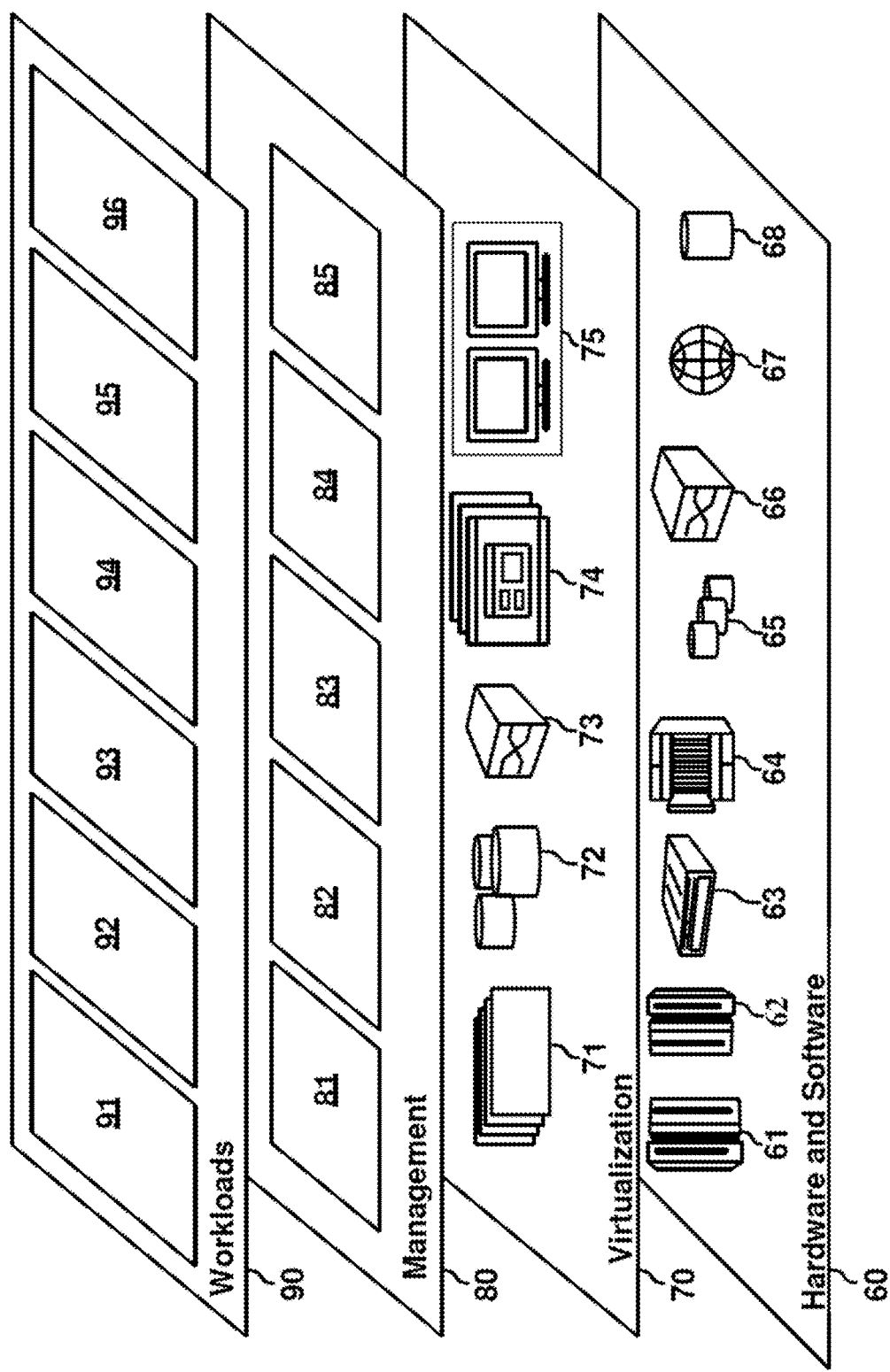
FIG. 17 depicts abstraction model layers according to one or more embodiments of the present invention.

Referring now to FIG. 17, a set of functional abstraction layers provided by cloud computing environment 50 (FIG. 16) is shown. It should be understood in advance that the components, layers, and functions shown in FIG. 17 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workloads and functions 96. Workloads and functions 96 may include various software applications in (and/or performs various functions) token computer systems 202, sidecar computer systems 250, backend services computer systems 280, authentication servers 270, etc., discussed herein.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   in response to intercepting an initial call for a transaction for a service from a client, validating a token for the initial call of the transaction for the service, the validating comprising contacting an authentication server and locally storing a time to live received for the token;
   in response to intercepting at least one successive call for the transaction for the service from the client, determining that the token for the at least one successive call is valid based on the time to live locally saved;
   permitting the at least one successive call for the transaction for the service to pass without contacting the authentication server, wherein the transaction comprises a plurality of calls before being committed, the plurality of calls comprising the initial call and the at least one successive call;
   determining that the at least one successive call is a last call for the transaction before being committed; and
   in response to the at least one successive call as the last call for the transaction being valid based on the time to live locally saved, committing the transaction.

2. The computer-implemented method of claim 1 further comprising:
   determining that the token for a last successive call is invalid based on the time to live locally saved having expired;
   preventing the last successive call for the transaction for the service from passing; and
   rolling back the transaction.

3. The computer-implemented method of claim 1, further comprising:
   in response to the transaction being committed or rolled back, clearing the time to live for the token thereby avoiding unauthorized reuse of the token.

4. The computer-implemented method of claim 1, wherein determining that the token for the at least one successive call is valid based on the time to live locally saved comprises preventing a backend services computer system from contacting the authentication server for validation of the token for the at least one successive call.

5. The computer-implemented method of claim 1, wherein determining that the token for the at least one successive call is valid based on the time to live locally saved avoids requiring a backend services computer system from contacting the authentication server for validation of the token for the at least one successive call.

6. The computer-implemented method of claim 1, wherein the transaction causes modification to at least one resource associated with a backend services computer system.

7. A system comprising:
   a memory having computer readable instructions; and
   one or more processors for executing the computer readable instructions, the computer readable instructions controlling the one or more processors to perform operations comprising:
      in response to intercepting an initial call for a transaction for a service from a client, validating a token for the initial call of the transaction for the service, the validating comprising contacting an authentication server and locally storing a time to live received for the token;
      in response to intercepting at least one successive call for the transaction for the service from the client, determining that the token for the at least one successive call is valid based on the time to live locally saved;
      permitting the at least one successive call for the transaction for the service to pass without contacting the authentication server, wherein the transaction comprises a plurality of calls before being committed, the plurality of calls comprising the initial call and the at least one successive call;
      determining that the at least one successive call is a last call for the transaction before being committed; and
      in response to the at least one successive call as the last call for the transaction being valid based on the time to live locally saved, committing the transaction.

8. The system of claim 7, wherein the operations further comprise:
   determining that the at least one successive call is a last call for the transaction; and
   committing the transaction.

9. The system of claim 7, wherein the operations further comprise:
   determining that the token for a last successive call is invalid based on the time to live locally saved having expired;

preventing the last successive call for the transaction for the service from passing; and rolling back the transaction.

10. The system of claim 7, wherein the operations further comprise:

in response to the transaction being committed or rolled back, clearing the time to live for the token thereby avoiding unauthorized reuse of the token.

11. The system of claim 7, wherein determining that the token for the at least one successive call is valid based on the time to live locally saved comprises preventing a backend services computer system from contacting the authentication server for validation of the token for the at least one successive call.

12. The system of claim 7, wherein determining that the token for the at least one successive call is valid based on the time to live locally saved avoids requiring a backend services computer system from contacting the authentication server for validation of the token for the at least one successive call.

13. The system of claim 7, wherein the transaction causes modification to at least one resource associated with a backend services computer system.

14. A computer-implemented method comprising:

in response to intercepting a token call with an application programming interface (API) key for a transaction for a service from a client, contacting an access decision engine to obtain a token list for the APIkey and an access policy for the APIkey, wherein the APIkey, the token list, and the access policy are associated together and locally stored;

in response to intercepting a call for the service having the APIkey and a token, determining that the call is to be given access to the service based on the token list and the access policy for the APIkey locally stored; and permitting the call for the service to access a resource without contacting the access decision engine.

15. The computer-implemented method of claim 14 further comprising determining that a subsequent call for the service having the APIkey and another token is to be given access to the service based on the token list and the access policy for the APIkey locally stored.

16. The computer-implemented method of claim 14, wherein determining that the call is to be given access to the service based on the token list and the access policy for the APIkey locally stored comprises confirming that the token is on the token list and confirming that the access policy permits the APIkey to access the service, without contacting the access decision engine.

17. The computer-implemented method of claim 14 further comprising monitoring for an APIkey revoke event.

18. The computer-implemented method of claim 17 further comprising, in response to the APIkey revoke event being present, revoking the token list associated with the APIkey that has been revoked, thereby preventing the APIkey from further use.

19. The computer-implemented method of claim 17 further comprising, in response to the APIkey revoke event being absent, permitting the token list locally stored to continue being used for determining access for the APIkey.

* * * * *